United States Patent [19]

Schramm et al.

[11] Patent Number: 4,592,897

[45] Date of Patent: Jun. 3, 1986

[54] INPUT ASSEMBLY FOR HIGH-TEMPERATURE CHEMICAL REACTOR

[75] Inventors: Dale E. Schramm; Oscar T. Scott, IV, both of Borger, Tex.

[73] Assignee: J. M. Huber Corporation, Locust, N.J.

[21] Appl. No.: 647,959

[22] Filed: Sep. 5, 1984

[51] Int. Cl.[4] .............................................. B01J 1/00
[52] U.S. Cl. .................................... 422/145; 422/146; 422/173; 422/232; 422/310
[58] Field of Search .............. 422/129, 145, 146, 173, 422/310, 232

[56] References Cited

U.S. PATENT DOCUMENTS 3,190,470 6/1965 Ritter .................................. 422/232

Primary Examiner—Frank Sever
Attorney, Agent, or Firm—Alec H. Horn

[57] ABSTRACT

A feed input assembly 2 for a high-temperature chemical reactor 4 includes a feed tube 6 having a feed inlet opening 8 and a feed-discharge opening 12. A cooling jacket 14 surrounds a length of the feed tube 6 extending from the feed-discharge opening 12. The cooling jacket 14 has an inlet 22 and an outlet 24 for respectively receiving and discharging a coolant. A coolant channel 17 is formed by a space between the cooling jacket 14 and the feed tube 6. The input assembly also includes flow-directing conduit means 32 for directing a flow of coolant from the inlet 22 of the cooling jacket 14 against inner wall portions of the feed tube 6 and cooling jacket 14 adjacent the feed-discharge opening 12.

20 Claims, 7 Drawing Figures

INPUT ASSEMBLY FOR HIGH-TEMPERATURE CHEMICAL REACTOR

FIELD OF THE INVENTION

The present invention relates to an assembly for introducing a feed material into a heated zone of a hightemperature chemical reactor, and more particularly, to a fluid-cooled assembly for a high-temperature fluid-wall reactor having a radiantly heated reaction zone.

BACKGROUND OF THE INVENTION

U.S. Pat. No. 4,199,545 discloses a chemical reactor capable of carrying out selected chemical reactions at extremely high temperatures. The reactor includes a vertically disposed reactor tube made of a fabric of fibrous refractory material capable of being heated to temperatures at which it emits intense radiant energy. The reactor includes electrically resistive heating elements spaced about the reactor tube for heating a reaction zone of the tube. A heat shield surrounds the heating elements and the reactor tube for reflecting radiant energy toward the reaction zone.

In operation, reactants are dropped through the heated reaction zone of the reactor tube where they are heated to high temperatures by radiant energy emitted by the fabric wall of the reactor tube. In order to prevent reactants and reaction products from adhering to the wall of the reactor tube, a gas which is substantially transparent to radiant energy and preferably inert with respect to the heated wall material is caused to flow radially inwardly through the pores of the fabric of the reactor tube to form a protective fluid wall for the inner surface of the reactor tube.

The U.S. Pat. No. '545 patent discloses inlet assemblies for introducing liquid and solid reactants into the reaction zone of the reactor. The inlet assembly for solid reactants includes an inlet tube which extends into the reactor tube generally along an axis of the reactor tube. A feed exit end of the inlet tube is surrounded by a tubular shroud which assists in containing finely divided solid reactants certrally within the reactor tube. The inlet assembly for liquid reactants also includes an inlet tube which extends into the reactor tube generally along an axis of the reactor tube. A fogging nozzle is mounted on the end of the inlet tube to introduce liquid reactants into the reactor tube as a fog.

The feed exit ends of the inlet tubes for liquid and solid reactants in the reactor of the '545 patent are located adjacent to a prereaction zone of the reactor tube. The prereaction zone is located above the reaction zone and is generally shielded from direct heating by the heating elements. Consequently, the temperature of the prereaction zone is typically substantially lower than the temperature of the reaction zone. In a commercial embodiment of the reactor of the U.S. Pat. No. '545 patent, the wall of the reactor tube adjacent to the prereaction zone is made of a nonporous refractory material and is not protected by a fluid wall.

The inlet assemblies for the reactor of the U.S. Pat. No. '545 patent have given rise to a number of significant problems. Although the wall of the reactor tube adjacent to the prereaction zone is lower in temperature than the wall adjacent to the reaction zone, it is often sufficiently hot to melt many solid feed materials introduced into the reactor. Moreover, since the wall adjacent to the prereaction zone is not protected by a fluid wall in the commercial embodiment of the reactor, solid feed material discharged from the inlet tube frequently impinges upon the wall of the prereaction zone and melts to form a slag. The molten slag then runs down the wall of the reaction tube and disrupts the fluid wall adjacent the reaction zone. Moreover, the molten slag is often corrosive and frequently attacks the reactor tube material. Liquid reactants discharged from the fogging nozzle also frequently impinge upon the wall of the prereaction zone, where they tend to corrode the wall or decompose to form solid deposits which tend to choke off flow through the reactor tube.

The precise location of the feed exit for the inlet assembly of the commercial embodiment of the above reactor has also presented problems. Locating the inlet assembly feed exit close enough to the mouth of the reaction zone to prevent feed material from striking the wall of the prereaction zone may cause the exit of the inlet assembly, which was made of metal, to melt from exposure to the intense radiant energy from the adjacent reaction zone. Also, slag deposits formed from melting feed material may accumulate on the exit of the inlet assembly, and such slag deposits may deflect the feed material against the wall of the reactor tube, thereby disrupting the protective fluid wall. Furthermore, exposure of the inlet assembly to the intense radiant energy at the mouth of the reaction zone causes severe deterioration of the inlet assembly, thereby increasing reactor component replacement costs and reactor downtime.

The disadvantages of the prior art are overcome by the present invention, and an improved feed tube assembly is hereinafter disclosed which may be mounted at a preferred location within the reactor without encountering numerous problems associated with the prior art inlet assemblies.

SUMMARY OF THE INVENTION

An improved input assembly or feed tube assembly is provided for introducing feed materials into a heated reaction zone of a high-temperature chemical reactor. The feed tube assembly is particularly adapted for continually discharging feed material adjacent a high-temperature reaction zone heated by radiant energy without experiencing substantial deterioration of the feed tube assembly.

The feed input assembly of the invention includes an elongated feed tube having a feed inlet opening at one end and a feed discharge opening at the opposite end. The input assembly further includes a cooling jacket which surrounds a length of the feed tube extending from the feed-discharge opening of the feed tube. The cooling jacket has an inlet and an outlet for respectively receiving and discharging a coolant. A channel for flowing coolant is formed by a spacing between the cooling jacket and the feed tube for cooling and length of feed tube and the cooling jacket. Portions of the feed tube and the cooling jacket adjacent to the feed-discharge opening of the feed tube define a feed-discharge tip of the input assembly.

The input assembly of the invention further includes flow-directing conduit means for directing a flow of coolant from the inlet of the cooling jacket against inner wall portions of the feed-discharge tip to cool the tip. Preferably, the flow-directing conduit means includes two or more flow-director tubes which extend generally parallel to the feed tube in the coolant channel. When a plurality of such flow-director tubes are used, the inlet of the cooling jacket preferably includes a like plurality of cooling-jacket inlet ports. One end of each coolant flow-director tube is connected to a cooling-jacket inlet port of the cooling jacket to receive a flow of coolant. The opposite end of the coolant flow-director tube is located close to the feed-discharge tip of the inlet assembly and is oriented to direct coolant against an inside wall portion of the feed-discharge tip to cool the tip. The end of the coolant flow-director tube is preferably located a distance from the inner wall of the feed-discharge tip measured along the axis at the flow-director tube of no greater than about two diameters of the flow-director tube. Most preferably at least four flow-director tubes spaced at intervals about the feed tube are used.

When the feed input assembly includes a plurality of flow director tubes connected to cooling-jacket inlet ports, the input assembly also preferably includes a coolant distribution manifold which is connected to the cooling-jacket adjacent to the inlet ports. The coolant distribution manifold has a coolant supply port and a manifold chamber which communicates with the coolant supply port and the cooling-jacket inlet ports for receiving a supply of coolant and distributing it to the inlet ports. The capacity of the manifold chamber is preferably sufficiently great to insure that the flow of coolant into each cooling-jacket inlet port is substantially equal.

The feed input assembly is preferably made of stainless steel to resist corrosion, although other materials may be used if desired. To minimize absorbtion of radiant energy, the feed-discharge tip of the inlet assembly is preferably polished to a mirror finish. The inlet assembly tip is preferably rounded in shape in order to promote efficient cooling.

The feed input assembly of the invention is used to advantage with a high-temperature chemical reactor of the type disclosed in the U.S. Pat. No. '545 patent identified above. The input assembly is generally mounted on the top of such a reactor with the feed tube and cooling jacket extending into the reactor tube. The axis of the feed tube of the input assembly preferably substantially coincides with the axis of the reactor tube of the reactor so that the feed material will be directed centrally within the reaction zone of the reactor tube. The feed-discharge opening of the feed tube is preferably located as far from the mouth of the reaction zone of the reactor tube as is consistent with the requirement that the feed material not strike the wall of the prereaction zone. The preferred distance between the feed discharge opening of the feed tube and the mouth of the reaction zone thus depends in part on the characteristics of the feed material. For finely-divided granular feed material, it may in some cases be preferred to locate the feed discharge opening a distance approximately equal to the inside diameter of the reactor tube from the mouth of the reaction zone of the reator tube.

To introduce liquid reactants into the reactor tube, it is convenient to use a liquid-input tube which has a fogging nozzle mounted on one end. The liquid-input tube is inserted in the feed tube of the input assembly of the invention with a fog-discharge opening of the fogging nozzle located close to, but recessed from, the feed discharge opening of the feed tube. The feed input assembly of the invention thereby provides a thermal shield for the liquid-input tube and fogging nozzle.

It is preferred to mount the feed input assembly of the invention to the high-temperature chemical reactor with an adjustable mounting assembly which permits the orientation of the feed tube to be adjusted relative to the axis of the reactor tube and the depth of insertion of the feed tube into the reactor tube to be varied. A preferred mounting assembly is disclosed in co-pending United States patent application Ser. No. 647,948.

Water, preferably containing an antifreeze compound such as ethylene glycol, is a preferred coolant for the feed input assembly of the invention. An approximately 40-percent solution by volume of ethylene glycol in water has been found to be a satisfactory coolant for many applications. Other heat-transfer fluids, such as one of the "Dowtherm" synthetic heat transfer fluids available from Dow Chemical Company of Midland, Michigan, may be preferred for the coolant in certain applications.

When an aqueous coolant such as ethylene glycol and water is used, the flow rate of coolant is preferably selected so that in operation the coolant increases in temperature by no more than about 20° C. upon passing through the inlet assembly, and most preferably by no more than about 5° C. Substantially higher increases in temperature may be preferable for nonaqueous coolants. Flow rates of aqueous coolant sufficiently high to prevent the coolant temperature from rising no more than 5° C. tend to insure that the coolant does not vaporize at the feed-discharge tip of the inlet assembly. If the coolant vaporized in the coolant channel, deposits might form which could impair the efficiency of heat transfer between the feed-discharge tip and the coolant, thereby possibly causing the tip to overheat.

In one embodiment of the invention suitable for a high-temperature fluid-wall chemical reactor, a flow-rate in the range of from about 20 to about 30 liters per minute was found to be satisfactory for a coolant of about 40 percent by volume ethylene glycol in water even with the reaction zone of the chemical reactor operating at temperatures in excess of about 2200° C. For an exemplary input assembly, the coolant-jacket wall is approximately 3.5 in. ( 9 cm) in diameter, the feed tube is approximately 0.75 in. (1.91 cm) in diameter, and the cooling jacket is approximately 54 in. (137 cm) long.

An input assembly of the present invention operated satisfactorily with a high-temperature chemical reactor of the type disclosed in the U.S. Pat. No. '545 patent for over 100 hours with the reaction zone heated to temperatures in the range of from about 2200° C. to about 2500° C. without any sign of significant degradation of the feed-discharge tip. Even when the reaction zone was operated at temperatures in excess of 2200° C., the input assembly could be withdrawn from the reactor tube and the feed-discharge tip touched by hand without discomfort. No deleterious slag deposits were formed on the feed-discharge tip of the input assembly, and slag formation on the wall of the reactor tube was effectively avoided.

These and other features and advantages of the present invention will become apparent from the following detailed description, wherein reference is made to the Figures in the accompanying drawings.

DETAILED DESCRIPTION OF PREFERRED EMBODIMENTS

Figure 1:
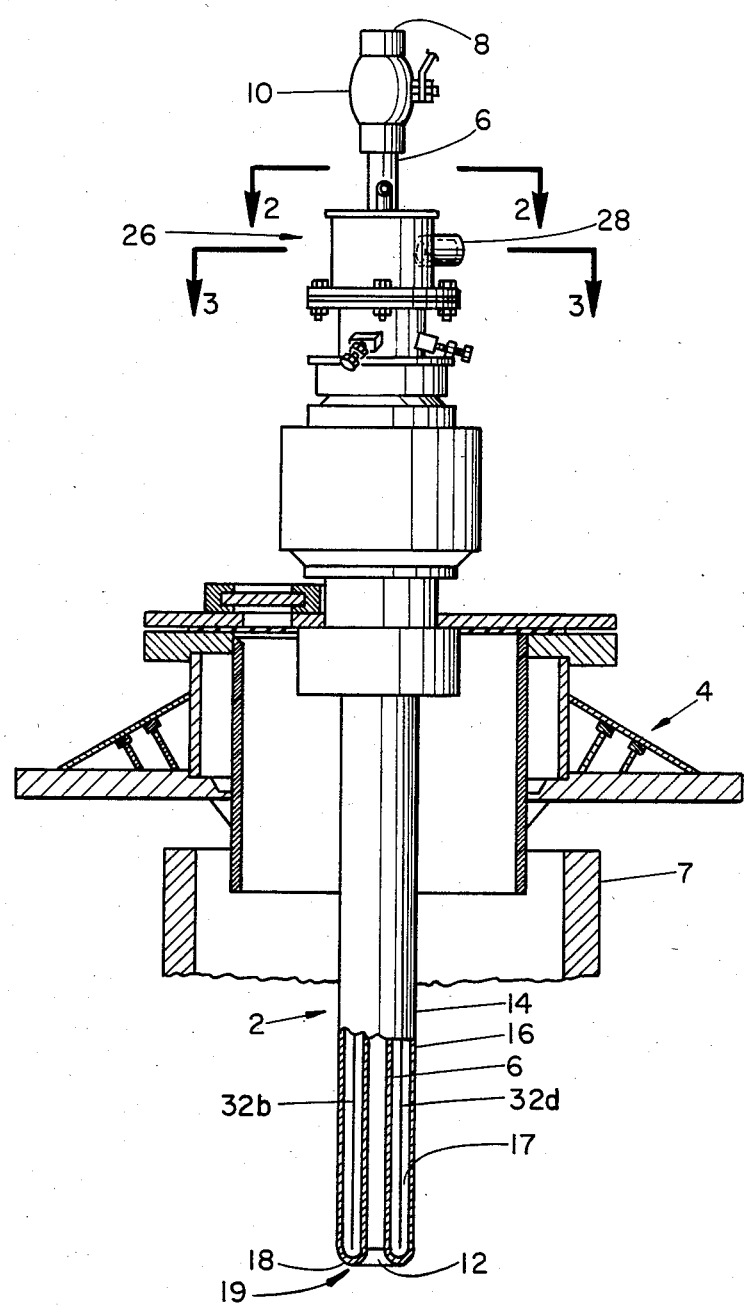
FIG. 1 is a plan view in partial section of a feed input assembly of the invention mounted in a high-temperature chemical reactor.
Figure 2:
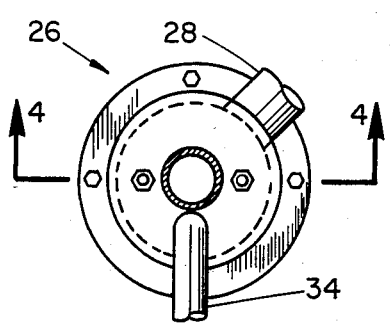
FIG. 2 is a section taken substantially along line 2—2 of FIG. 1.

Referring now to FIG. 1, a feed input assembly 2 is mounted in a high-temperature chemical reactor 4 having a reactor tube 7. A stainless steel feed tube 6 extends in a generally vertical orientation from a point outside of the chemical reactor 4 to point within the reactor tube 7 of the reactor. A feed-inlet opening 8 of the feed tube 6 is equipped with a feed inlet valve 10. An opening at the opposite end of the feed tube 6 defines a feed discharge opening 12.

A cooling jacket 14 surrounds a length of the feed tube 6 extending from the feed discharge opening 12 to a point outside of the reactor 4. The cooling jacket 14 includes a cylindrical cooling-jacket wall 16 made of stainless steel. An annular gap between a radially outer surface of the feed tube 6 and a radially inner surface of the cooling-jacket wall 16 defines an annular coolant channel 17. One end of the cooling jacket wall 16 is joined to the feed tube 6 at the feed-discharge opening 12 by a first annular end wall 18. The annular end wall 18 is made of stainless steel and has a rounded hemitoroidal shape. The first end wall 18 of the cooling jacket 14 together with adjacent portions of the feed tube 6 and cooling-jacket wall 16 define the feed-discharge tip 19 of the input assembly 2. The feed-discharge tip 19 is exposed to intense radiant energy from the reaction zone (not shown) of the reactor tube 7. The feed-discharge tip 19 is polished to a mirror finish to reflect radiant energy to minimize heat absorption A second annular end wall 20, shown best in FIGS. 3, 4, and 5, connects the opposite end of the cooling-jacket wall 16 to the feed tube 6. The second end wall 20 has five cooling-jacket inlet ports 22a–22e passing through it. In addition, a cooling-jacket outlet port 24 passes through the second end wall 20.

Figure 3:
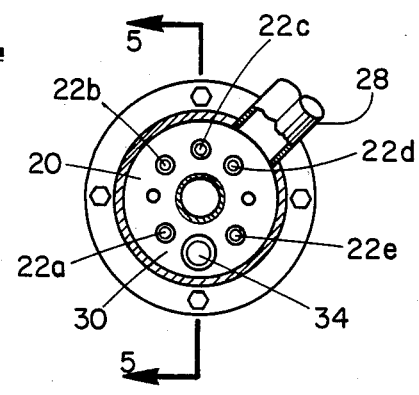
FIG. 3 is a section taken substantially along line 3—3 of FIG. 1.

Turning again to FIG. 1, a coolant distribution manifold 26 is mounted above the cooling-jacket 14, encircling the feed tube 6. The coolant distribution manifold 26 has a coolant supply port 28 which communicates with an interior of the manifold 26 which defines a manifold chamber 30. The coolant distribution manifold 26 is joined to the second end wall 20 of the cooling jacket 14 in a fluid tight manner. The cooling-jacket inlet ports 22a–22e also communicate with the manifold chamber 30 of the fluid distribution manifold 26 to receive coolant from the manifold, as shown in FIG. 3.

Figure 4:
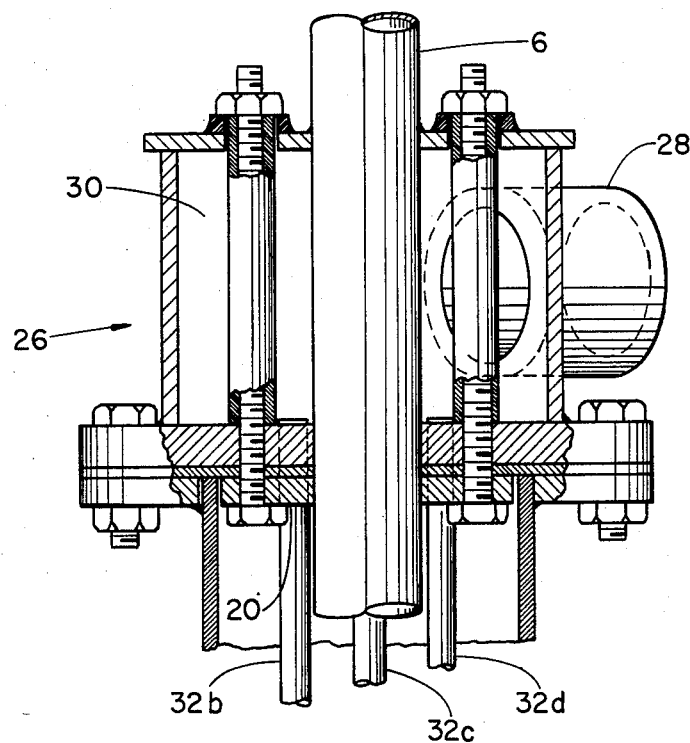
FIG. 4 is a section taken substantially along line 4—4 of FIG. 2.
Figure 5:
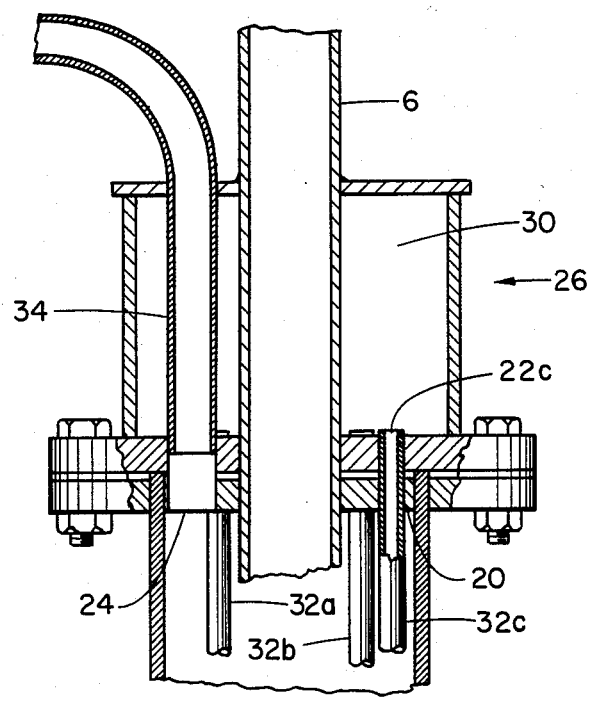
FIG. 5 is a section taken substantially along line 5—5 of FIG. 3.

Five coolant flow-director tubes 32a–32e are each connected at one end to a respective cooling-jacket inlet port 22a–22e, as may be seen in FIGS. 4 and 5. The coolant flow-director tubes 32a–32e extend generally parallel to the feed tube 6 in the coolant channel 17, as may be seen in FIG. 1. The lower ends of the coolant flow-director tubes 32 are located close to the first annular end wall 18 of the cooling jacket 14 and arranged to direct coolant against the inner surface of the end wall 18.

A coolant outlet tube 34 is connected to the cooling-jacket outlet port 24 of the second end wall 20 of the cooling jacket 14. The coolant outlet tube 34 passes through the manifold chamber 30 of the coolant distribution manifold 26 and out a top wall of the manifold. The coolant outlet tube 34 is connected to a return line to a coolant heat exchanger (not shown).

In operation, a coolant consisting of an approximately 40-percent solution of ethylene glycol in water is introduced into the coolant supply port 28 of the coolant distribution manifold 26 of the input assembly 2 from the coolant heat exchanger (not shown). The coolant flows from the coolant supply port 28 through the manifold chamber 30 of the coolant distribution manifold 26 and into the coolant flow-director tubes 32. The capacity of the manifold chamber 30 is sufficiently large that the rate of flow of coolant into each of the coolant flow-director tubes 32 is substantially equal. The coolant flows down the flow-director tubes 32 to the lower ends of the tubes where it is discharged from the tubes and directed at the inner surface of the feed-discharge tip 19 of the input assembly 2. The coolant then flows up the coolant channel 17 between the feed tube 6 and the coolant-jacket wall 16 and exits the cooling jacket 14 through the cooling-jacket outlet port 24. The coolant then returns to the heat exchanger for recirculation.

In practice, the temperature of the coolant at the inlet 28 of the coolant distribution manifold 26 varies with the ambient weather conditions, typically ranging from about 0° C. in the winter months to about 60° C. in the summer months. A flow rate of about 30 liters of coolant per minute is generally limits the rise in temperature of an aqueous coolant upon passing through the input assembly to less than about 15° C.

Figure 6:
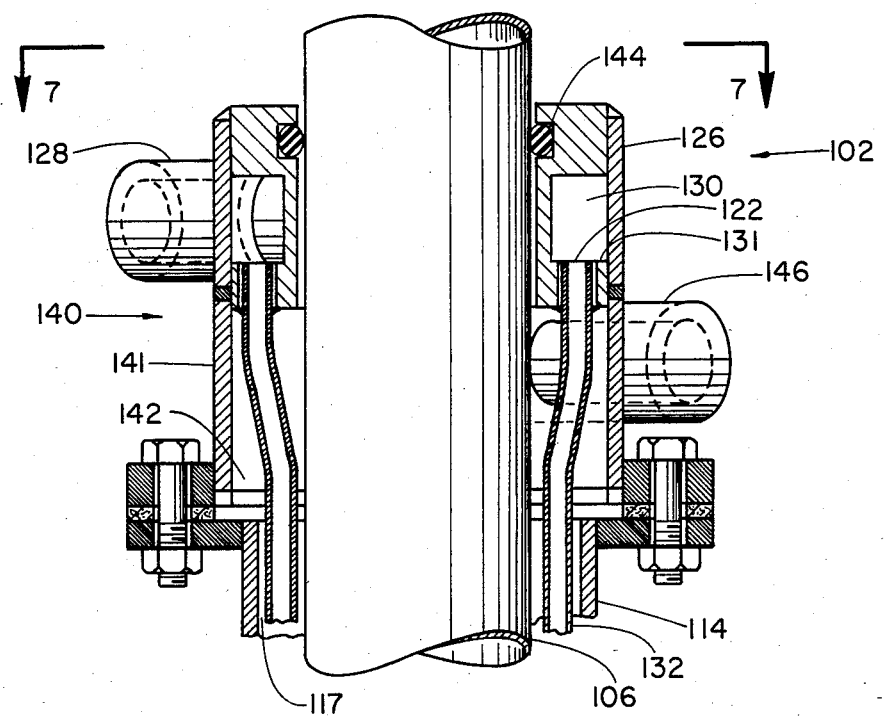
FIG. 6 is a plan view in partial section of an alternative embodiment of a coolant manifold of the invention.

Turning now to FIG. 6, a feed input assembly 102 has a stainless steel feed tube 106 which extends into the reactor tube (not shown) of a high-temperature chemical reactor. A cooling jacket 114 surrounds a length of the feed tube 106 generally as the cooling jacket 14 surrounds the feed tube 6 in the embodiment illustrated in FIG. 1. An annular gap between a radially-outer surface of the feed tube 106 and a radially inner surface of a cooling jacket wall defines an annular coolant channel 117.

A dual-chamber manifold 140 has a coolant-distribution manifold section 126 and a coolant-discharge manifold section 141. The dual-chamber manifold 140 has a feed-tube opening passing through it through which the feed-tube 106 extends.

Figure 7:
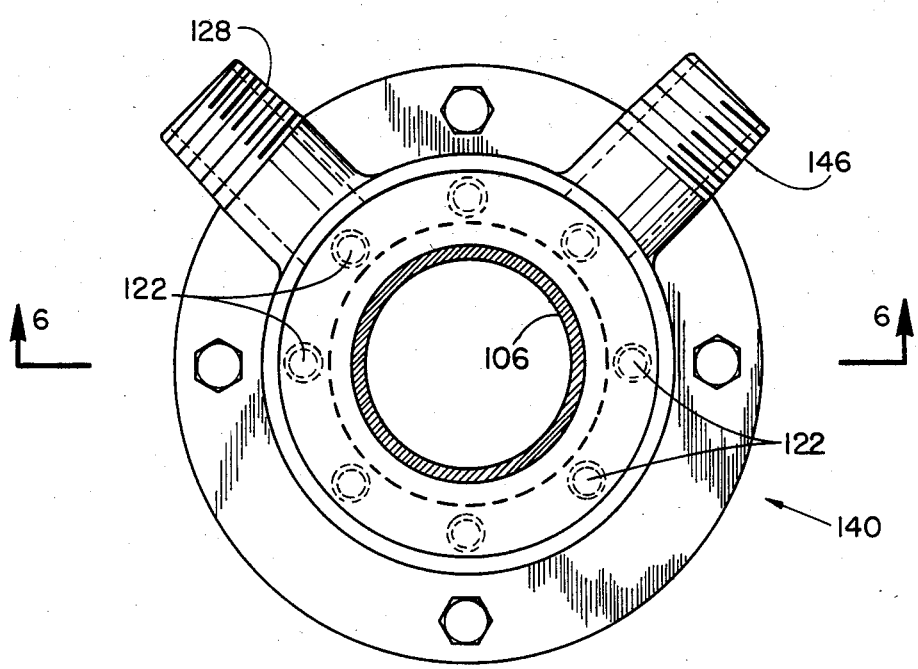
FIG. 7 is a section taken along line 7—7 of FIG. 6.

The coolant-distribution manifold section 126 of the dual-chamber manifold 140 has an annular channel encircling the feed tube 106 which defines a distribution manifold chamber 130. A coolant supply port 128 communicates with the distribution manifold chamber 130. An annular partition 131 which adjoins the distribution manifold chamber 130 has eight cooling-jacket inlet ports 122 passing through it. As shown best in FIG. 7, the eight cooling-jacket inlet ports are spaced apart from one another around the feed tube 106 at approximately equal intervals. Connected to each cooling-jacket inlet port 122 is an end of one of eight coolant flow-director tubes 132. Each coolant flow-director tube 132 extends from the coolant distribution manifold section 126 to a point close to an inner surface of an annular end wall (not shown) of the cooling jacket 114.

The coolant discharge manifold section 141 encircles the feed tube 106 at a location between the coolant distribution manifold 126 and an end of the cooling jacket 114. An annular space between a radially outer surface of the feed tube 106 and a radially inner surface of a tubular outer wall of the discharge manifold section 140 defines a discharge manifold chamber 142. An O-ring seal 144 provides a fluid-tight seal between the outer wall of the feed tube 106 and the housing of the dual chamber manifold 140. The discharge manifold section 141 is connected to the cooling jacket 114 in a fluid-tight manner to serve as an end wall of the cooling jacket. The annular coolant channel 117 which surrounds the feed tube 106 opens into the discharge manifold chamber 142. A coolant discharge port 146 also communicates with the discharge manifold chamber 142 and serves an an outlet for the cooling jacket 114.

In operation, coolant is introduced into the coolant supply port 128 of the feed input assembly 102. The coolant flows through the coolant distribution manifold chamber 130 and into the flow director tubes 132 through the cooling-jacket inlet ports 122. The coolant flows through flow director tubes 132 to the lower ends of the tubes where it is discharged from the tubes and directed to the inner surface of the feed discharge tip (not shown) of the input assembly 102. The coolant then flows up the coolant channel 117 and into the discharge manifold chamber 142 and is discharged from the assembly 102 through the discharge port 146.

Alternatively, coolant may be initially discharged from the coolant manifold chamber 142 down the coolant channel 117. Flow director tubes 132 may remain as illustrated with the lower ends of the tubes adjacent the inner surface of the feed discharge tip. Coolant may thus flow down the channel 117 and be drawn into and up the tubes 132 to the discharge port. Coolant will thus still flow past the inner surface of the feed tube discharge tip, although coolant according to this latter embodiment may be slightly warmer when passing by the discharge tip since being initially warmed while passing down the channel 117.

The preferred location for the discharge end of the input assembly relative to the reactor tube will necessarily depend on the location of the reactor tube and the heating elements relative to the reactor. An alternate embodiment illustrating the approximate location of a feed tube discharge relative to the reactor tube is disclosed in U.S. Patent Application Ser. No. 647,948 filed concurrently herewith. The above application discloses a pivotable reactor feed tube mounting assembly with a feed tube discharge within or above the reactor tube. Further details regarding a suitable reactor and its operation as it relates to the input assembly of the present invention are disclosed in the above application, as well as U.S. Patent Application Ser. No. 647,958, also filed concurrently herewith. Both the above applications are accordingly hereby incorporated by reference.

It is not intended to limit the present invention to the specific embodiments described above. Coolant may be directed to the inner surface of the feed-discharge tip by flow directing conduit means other than a plurality of flow-director tubes. Other changes and modifications may be made in the apparatus specifically described herein without departing from the spirit and scope of the present invention. Accordingly, it should be understood that the embodiments described herein and shown in the accompanying drawings are exemplary only and are not intended as limitations on the scope of the invention.

What is claimed is:

1. A feed input assembly for directing a feed material into a heated zone of a high-temperature chemical reactor, comprising:
    an elongate feed tube having an inlet opening at one end and a feed-discharge opening at an opposite end;
    an outer cooling jacket surrounding a length of said feed tube extending from said feed-discharge opening;
    an annulus between said cooling jacket and said feed tube defining a coolant channel for housing coolant;
    a coolant channel inlet for introducing coolant into said channel;
    a coolant channel outlet for discharging coolant from said channel;
    a portion of said cooling jacket forming a feed-discharge tip adjacent said feed-discharge opening of said feed tube; and
    conduit means positioned within said annulus for directing coolant against inner wall portions of said feed-discharge tip for cooling said feed-discharge tip and preventing deterioration of said feed-discharge tip or premature reaction of said feed material adjacent said feed-discharge tip due to high temperatures adjacent thereto when said feed tube is mounted within said reactor.

2. The feed input assembly as defined in claim 1, wherein said conduit means terminates within said annulus at a location closely adjacent said feed-discharge tip.

3. The feed input assembly as defined in claim 2, wherein:
    said conduit means passes coolant from said coolant channel inlet and discharges coolant against said inner wall portions of said feed-discharge tip; and
    said coolant channel passes coolant from said inner wall portions of said feed-discharge tip to said coolant channel outlet.

4. The feed input assembly as defined in claim 1, wherein an outer surface of said feed-discharge tip is polished to reflect radiant energy.

5. The feed input assembly as defined in claim 4, wherein said outer surface of said polished feeddischarge tip has a hemitoroidal shape.

6. The feed input assembly as defined in claim 1, wherein:
    said coolant channel inlet includes a plurality of inlet ports;
    said conduit means includes a corresponding plurality of coolant flow-director tubes extending generally parallel to said feed tube; and
    one end of each of said coolant flow-director tubes being joined to a corresponding inlet port and the opposite end of said coolant flow-director tubes being located approximate said feed-discharge tip and oriented to direct coolant against said inner wall portions of said feed-discharge tip.

7. The feed input assembly as defined in claim 6, further comprising:
    a coolant distribution manifold connected to said cooling jacket adjacent said inlet ports and defining a manifold chamber in communication with said inlet ports; and
    a coolant supply port in communication with said manifold chamber for receiving a supply of coolant.

8. The feed input assembly as defined in claim 7, wherein:
said cooling jacket includes at least four cooling jacket inlet ports spaced at intervals about said feed tube; and
said conduit means includes at least four flow-director tubes connected respectively to said inlet ports.

9. The feed input assembly as defined in claim 5, wherein the distance between said opposite end of said coolant flow-director tubes and said feeddischarge tip is less than approximately twice the diameter of one of said coolant flow-director tubes.

10. A feed input assembly for directing a feed material into a heated zone of a high-temperture chemical reactor, comprising:
(a) an elongated feed tube, said feed tube having an opening at one end defining a feed inlet opening and an opening at an opposite end defining a feed discharge opening;
(b) a cooling jacket, including:
(b.1) a generally cylindrical coolingjacket wall surrounding and spaced radially apart from a length of said feed tube, an annular space between an inner surface of the cooling-jacket wall and an outer surface of the feed tube defining an annular coolant channel;
(b.2) a first annular end wall, an inside circumference of said first annular end wall being joined in a fluid-tight manner to said feed tube about a circumference of said feed discharge opening, and an outside circumference of said first end wall being joined in a fluid-tight manner to an end of said cooling-jacket wall, said first annular end wall and portions of said cooling-jacket wall and feed tube adjacent to said first annular end wall defining a feed-discharge tip of said feed input assembly; and
(b.3) a second annular end wall, an inner circumference of said second annular end wall being joined to said feed tube in a fluid-tight manner, and an outer circumference of said second annular end wall being joined to an end of the cooling-jacket wall in a fluid-tight manner, said second annular end wall having a plurality of cooling-jacket inlet ports and a cooling-jacket outlet port;
(c) a coolant distribution manifold connected to said second annular end wall of said cooling jacket, said coolant distribution manifold having a manifold chamber in communication with said cooling-jacket inlet ports and a coolant supply port in communication with said manifold chamber for receiving a supply of coolant and distributing coolant to said cooling-jacket inlet ports;
(d) a plurality of coolant flow-director tubes extending generally parallel to said feed tube in said annular coolant channel, one end of each coolant flow-director tube being joined to a cooling-jacket inlet port of said second annular end wall of said cooling jacket to receive coolant from said coolant distribution manifold and the opposite end of said coolant flow-director tube being located proximate to said feeddischarge tip of said input assembly and oriented to direct coolant against a wall portion of said feed discharge tip to cool said tip for preventing deterioration of said tip or premature reaction of said feed material adjacent said tip due to high temperature adjacent thereto when said feed tube is mounted within said reactor; and
(e) a coolant outlet tube connected to said cooling-jacket outlet port of said second annular end wall of said cooling jacket to receive coolant discharged from said annular coolant channel.

11. The feed input assembly as defined in claim 10, wherein said plurality of coolant flow-director tubes includes at least four flow-director tubes spaced at intervals about said feed tube.

12. The feed input assembly as defined in claim 11, wherein said first annular end wall of said cooling jacket has a hemitoroidal shape.

13. The feed input assembly as defined in claim 12, wherein the feed-discharge tip of the input assembly is polished to reflect radiant energy.

14. The feed input assembly as defined in claim 12, wherein the distance between a coolant discharge end of each coolant flow-direction tube along the axis of said flow-director tube and said feed-discharge tip is less than approximately twice the diameter of said flow-director tube.

15. A feed input assembly for directing a feed material into a radiantly-heated reaction zone of a high-temperature fluid-wall reactor, comprising:
an elongate feed tube having an inlet opening at one end and a feed-discharge opening at an opposite end;
an outer cooling jacket surrounding a length of said feed tube extending from said feed-discharge opening;
an annulus between said cooling jacket and said feed tube defining a coolant channel for housing coolant;
a coolant channel inlet for introducing coolant into said channel;
a coolant channel outlet for discharging coolant from said channel;
a portion of said cooling jacket forming a feed-discharge tip adjacent said feed-discharge opening of said feed tube;
an outer surface of said feed-discharge tip being hemitoroidally shaped and polished to reflect radiant energy from said reaction zone; and
conduit means positioned within said annulus directing coolant against inner wall portions of said feed-discharge tip and cooling said feed-discharge tip to prevent deterioriation of said feed discharge tip or premature reaction of said feed material due to high temperatures adjacent thereto when said feed tube is mounted within said reactor.

16. A feed input assembly as defined in claim 15, wherein said conduit means terminates within said annulus at a location closely adjacent said feed-discharge tip.

17. A feed input assembly as defined in claim 15, wherein:
said coolant channel inlet includes a plurality of inlet ports;
said conduit means includes a corresponding plurality of coolant flow-director tubes extending generally parallel to said feed tube; and
one end of each of said coolant flow-director tubes being joined to a corresponding inlet port and the opposite end of said coolant flow-director tubes being located adjacent said feed-discharge tip and oriented to direct coolant against said inner wall portions of said feed-discharge tip.

18. A feed input assembly as defined in claim 17, further comprising:
- a coolant distribution manifold connected to said cooling jacket adjacent said inlet ports and defining a manifold chamber in communication with said inlet ports; and
- a coolant supply port in communication with said manifold chamber for receiving a supply of coolant.

19. A feed input assembly as defined in claim 18, wherein:
- said cooling jacket includes at least four cooling jacket inlet ports spaced at intervals about said feed tube; and
- said conduit means includes at least four flow-director tubes connected respectively to said inlet ports.

20. A feed input assembly as defined in claim 17, wherein the distance between said opposite end of said conduit flow-director tubes and said feed-dischare tip is less than approximately twice the diameter of one of said flow-director tubes.

* * * * *

UNITED STATES PATENT AND TRADEMARK OFFICE
CERTIFICATE OF CORRECTION

PATENT NO. : 4,592,897

DATED : June 3, 1986

INVENTOR(S) : Dale E. Schramm and Oscar T. Scott, IV

It is certified that error appears in the above-identified patent and that said Letters Patent is hereby corrected as shown below:

Column 10, line 19, "flow-direction" should read --flow-director--.

Signed and Sealed this

Nineteenth Day of August 1986

[SEAL]

Attest:

DONALD J. QUIGG

Attesting Officer

Commissioner of Patents and Trademarks